United States Patent
Lilie et al.

(10) Patent No.: US 10,830,199 B2
(45) Date of Patent: Nov. 10, 2020

(54) METHOD FOR SLOW STARTING A RECIPROCATING ENGINE

(71) Applicant: GE Aviation Systems LLC, Grand Rapids, MI (US)

(72) Inventors: James Andrew Lilie, Grand Rapids, MI (US); Brian Christopher Kemp, Dayton, OH (US); James Thomas Zalusky, Beavercreek, OH (US)

(73) Assignee: GE Aviation Systems LLC, Grand Rapids, MI (US)

( * ) Notice: Subject to any disclaimer, the term of this patent is extended or adjusted under 35 U.S.C. 154(b) by 0 days.

(21) Appl. No.: 15/129,832

(22) PCT Filed: Apr. 7, 2014

(86) PCT No.: PCT/US2014/033174
§ 371 (c)(1),
(2) Date: Sep. 28, 2016

(87) PCT Pub. No.: WO2015/156761
PCT Pub. Date: Oct. 15, 2015

(65) Prior Publication Data
US 2017/0145979 A1    May 25, 2017

(51) Int. Cl.
*F02N 15/10* (2006.01)
*F02D 41/22* (2006.01)
(Continued)

(52) U.S. Cl.
CPC ............. *F02N 15/10* (2013.01); *F02D 41/22* (2013.01); *F02N 7/00* (2013.01); *F02N 7/08* (2013.01);
(Continued)

(58) Field of Classification Search
CPC ...... F02N 15/10; F02N 7/06; F02N 2200/022; F02N 2200/041; F02N 2200/042;
(Continued)

(56) References Cited

U.S. PATENT DOCUMENTS 3,646,917 A * 3/1972 Nagy .................... F02D 41/061
123/179.17
3,927,359 A * 12/1975 Chen ..................... F02N 11/006
290/38 R
(Continued)

FOREIGN PATENT DOCUMENTS

CN    101799359 A    8/2010
CN    101886580 A    11/2010
(Continued)

OTHER PUBLICATIONS

International Search Report and Written Opinion issued in connection with corresponding PCT application PCT/US2014/033174 dated Jan. 16, 2015.
(Continued)

*Primary Examiner* — George C Jin
(74) *Attorney, Agent, or Firm* — McGarry Bair PC

(57) ABSTRACT

A method for slow starting a reciprocating engine having a crankshaft, piston, and piston chamber is disclosed. The method includes applying a force to the crankshaft, sensing an engine characteristic, and determining if an error or fault is present in the engine.

20 Claims, 8 Drawing Sheets

(51) Int. Cl.
*F02N 7/08* (2006.01)
*F02N 7/00* (2006.01)
*F02N 11/10* (2006.01)

(52) U.S. Cl.
CPC ....... *F02N 11/106* (2013.01); *F02N 2200/022* (2013.01); *F02N 2200/041* (2013.01); *F02N 2200/042* (2013.01); *F02N 2300/102* (2013.01); *Y02T 10/40* (2013.01)

(58) Field of Classification Search
CPC ...... F02N 2300/102; F02N 7/00; F02N 11/00; F02N 11/10; F02N 11/101; F02N 11/006; F02N 11/08; F02B 3/06; F02D 41/3076; F02D 41/22; F02D 41/062; F02D 41/064; F02D 41/065; F02D 2041/227; F02D 2041/228
See application file for complete search history.

(56) References Cited

U.S. PATENT DOCUMENTS

| | | | | |
|---|---|---|---|---|
| 4,494,499 | A * | 1/1985 | Stein | F02N 7/08 123/179.1 |
| 4,702,273 | A * | 10/1987 | Allen, Jr. | F02C 7/277 123/179.31 |
| 5,327,997 | A | 7/1994 | Nash | |
| 6,729,293 | B2 | 5/2004 | Shifflette | |
| 8,661,834 | B2 * | 3/2014 | Tsuji | F02N 7/00 123/179.31 |
| 2002/0179348 | A1 * | 12/2002 | Tamai | F02D 41/062 180/65.25 |
| 2004/0000282 | A1 * | 1/2004 | Kataoka | F02D 13/0215 123/182.1 |
| 2006/0191518 | A1 * | 8/2006 | Kiessling | F02P 9/002 123/599 |
| 2010/0250089 | A1 | 9/2010 | Buslepp et al. | |
| 2013/0333635 | A1 * | 12/2013 | Geradts | B60L 7/14 123/2 |
| 2014/0277881 | A1 * | 9/2014 | Okubo | B60W 10/06 701/22 |

FOREIGN PATENT DOCUMENTS

| | | |
|---|---|---|
| FI | 123903 B | 12/2013 |
| JP | 2008-232072 A | 10/2008 |
| JP | 2012-180794 A | 9/2012 |
| WO | 2012171049 A1 | 12/2012 |

OTHER PUBLICATIONS

Danley, S., et al., "Engine Hydrostatic-lock Mitigation," WPI, pp. 1-179 (2009).
Gulley, J., "Slow Roll Phase 2 Performance Report," Tech Development, pp. 1-10 (Jul. 31, 2013).
Machine Translation and Notification of Reasons for Refusal issued in connection with corresponding JP Application No. 2016-559821 dated Nov. 7, 2017.
Machine translation and Office Action issued in connection with Corresponding CN Application No. 201480077860.3 dated Jan. 31, 2018.

* cited by examiner

METHOD FOR SLOW STARTING A RECIPROCATING ENGINE

BACKGROUND

A reciprocating engine, such as an internal combustion engine, is a heat engine that uses one or more reciprocating pistons to convert pressure into a rotating motion. In a typical example, each piston is housed in a sealable piston chamber or pressure chamber, and attached at its base to a rotatable shaft. As the piston slides along the piston chamber, the rotatable shaft is rotated, and vice versa. One example of a combustion cycle for the piston may include four piston strokes: intake stroke, compression stroke, combustion stroke, and exhaust stroke.

During the intake stroke, the piston is pulled out of the compression chamber, creating a vacuum, which draw in air from a sealable intake valve. Once the piston reaches the lowest point of its intake stroke, the intake valve is sealed, and the piston begins an upward compression stroke. The compression stroke slides the piston into the pressure chamber compressing the air. A combustible fuel may be added to the intake air prior to the intake stroke, or may be added during the compression stroke. At the end of the compression stroke, the air/fuel mixture is compressed in the pressure chamber until the mixture is combusted.

Combustion may occur due to the pressurized air/fuel mixture, or due to external ignition, such as a spark in the pressure chamber generated by a spark plug. During the combustion stroke, the explosion of the air/fuel mixture generates heat in the compressed gases, and the resulting expansion of the explosion and expanding gases drives the piston away from the pressure chamber. Following the combustion stroke, a sealable outlet valve opens, and the piston is driven into the pressure chamber to push the combusted, or exhaust gases, out of the pressure chamber. The cycle of the combustion engine may then repeat.

In an engine with multiple pistons, the pistons may be configured along the rotatable shaft to stagger the piston strokes, such that one or more pistons may be continuously providing a driving force (via the combustion stroke) to rotate the shaft, and thus the drive the pistons through the additional combustion cycle strokes. The mechanical force generated by the rotation of the rotatable shaft, due to the driving force of the pistons, may be further delivered to drive another component, such as a generator, wheels, or propeller.

BRIEF DESCRIPTION

One embodiment relates to a method of slow starting a reciprocating engine, having a crankshaft rotationally coupled with a piston reciprocally movable within a corresponding piston chamber. The method includes applying a force to the crankshaft to effect a movement of the piston in the piston chamber without providing pressure relief to the piston chamber during a compression stroke of the piston, sensing a reciprocating engine characteristic, comparing the sensed characteristic to a diagnostic profile for the sensed characteristic, and ceasing the application of the force, to cease reciprocation of the pistons when the comparison indicates a diagnostic fault condition exists.

Another embodiment relates to a method of slow starting with a pneumatic starter a reciprocating engine having pistons reciprocally movable within corresponding cylinders and operably coupled to a rotatable crankshaft wherein the relative rotation of the crankshaft results in a relative corresponding reciprocation of the pistons. The method includes supplying air to a pneumatic starter to rotate the crankshaft at a slow start speed below an operational rotational speed and effect a reciprocation of the pistons, sensing a reciprocating engine characteristic, comparing the sensed characteristic to a diagnostic profile for the sensed characteristic, determining whether a diagnostic fault condition exists or does not exist based on the comparison, and at least one of ceasing supplying air to the pneumatic starter or stopping operation of the pneumatic starter, to cease reciprocation of the pistons when a diagnostic fault condition exists.

DETAILED DESCRIPTION

Embodiments may be implemented in any environment using a reciprocating engine regardless of whether the reciprocating engine provides a driving force and/or is used for another purpose, such as to generate electricity. For purposes of this description, such a reciprocating engine will be generally referred to as a combustion engine, or similar language. While this description is primarily directed toward a diesel combustion engine, it is also applicable to any combustion engine, such as an internal combustion engine, fueled by gasoline, natural gas, methane, or diesel fuel. Further, while this description is primarily directed toward a marine engine environment, the embodiments are applicable in any environment using a combustion engine. Thus, a preliminary understanding of a combustion engine is provided.

Figure 1:
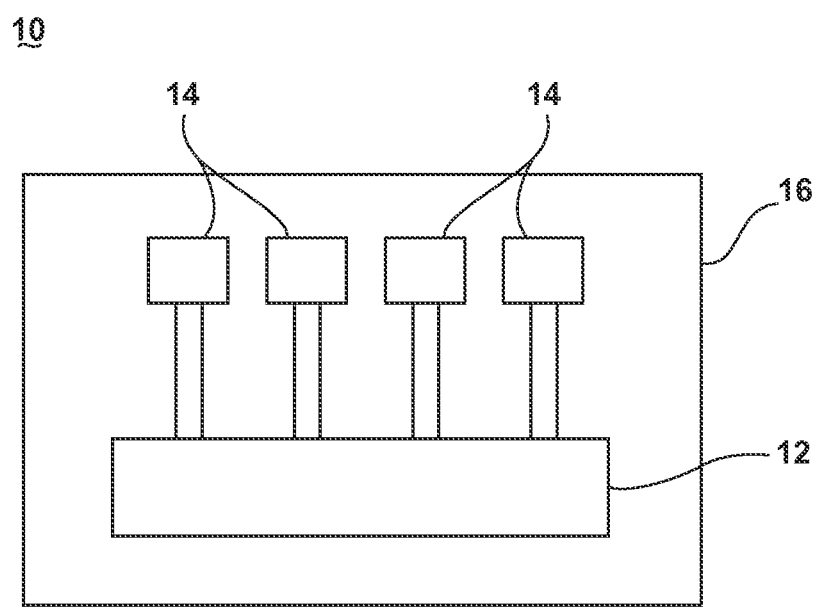
FIG. 1 is a schematic view of a combustion engine illustrating the crankshaft and pistons, in accordance with various aspects described herein.

FIG. 1 illustrates a schematic view of a reciprocating engine, such as a combustion engine 10, having a rotatable shaft, such as a crankshaft 12, and at least one piston 14 located within an engine block 16.

Figure 2:
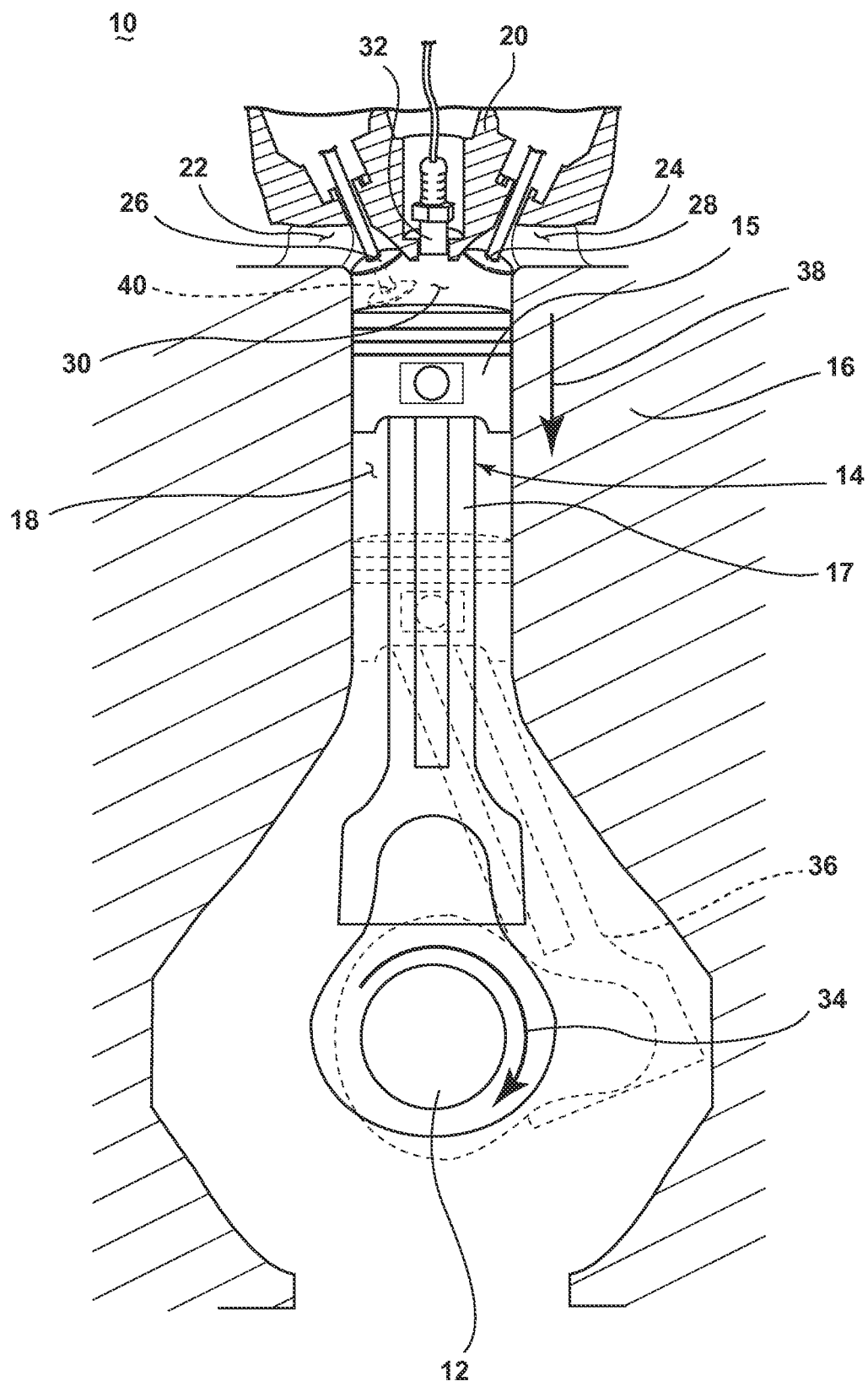
FIG. 2 is a schematic cross-sectional view of a piston in a combustion engine illustrating a top dead center piston position and an intake stroke with rotation of the crankshaft, in accordance with various aspects described herein.

FIG. 2 illustrates a cross-sectional view of a piston 14 from the combustion engine 10 of FIG. 1. As shown, the piston 14 located within the corresponding portion of the engine block 16 at least partially defines a piston chamber 18 or piston cylinder. The piston 14 may further comprise a piston head 15 rotatably coupled with a piston shaft 17, with the piston head being slidable within the piston chamber 18. The piston shaft 17 is rotatably coupled to a pin on the crankshaft, which is radially offset from a rotation axis of the crankshaft, such that rotation of the crankshaft causes a reciprocation of the piston head 15 within the piston chamber 18.

While only one piston 14 is shown in FIG. 2, a combustion engine 10 typically has multiple pistons 14 contained within corresponding piston chambers 18, with each piston 14 being mounted to a different pin on the crankshaft 12, with the pins being radially spaced about the rotational axis of the crankshaft 12. The pistons 14 may be arranged in one or more linear rows, where an engine with only one row of linearly aligned pistons 14 being referred to as an inline arrangement. Engines 10 with multiple rows of pistons 14 may have an angular spacing between the rows forming. When the angle is less the 180 degrees, the engine 10 is often referred to as a V arrangement. When the angle is 180 degrees, the engine 10 is often referred to as an opposed arrangement. The pistons 14 may also be radially spaced about the crankshaft 12, which is often referred to as a radial arrangement.

The movement of the piston 14 into and/or out of the piston chamber 18 may, hereafter, be described as "strokes" or "piston strokes." While the disclosure may contain descriptions of "upward" strokes, wherein the piston 14 is moved farther into the piston chamber 18, away from the crankshaft 12, and "downward" strokes, wherein the piston 14 is removed from the piston chamber 18 toward the crankshaft 12, embodiments may include a combustion engine 10 having vertical, or angled strokes. Thus, the phrases "upward" and "downward" are non-limiting, relative terms for embodiments.

As shown, the combustion engine 10 may further include an engine head portion 20 comprising a sealable air intake passage 22 and a sealable exhaust passage 24, each passage 22, 24 fluidly coupled with, and sealable from the piston chamber 18 via a respective intake valve 26, and exhaust valve 28. Collectively, the piston head 15, engine block 16, head portion 20, intake valve 26, and exhaust valve 28 may define a sealable, compression chamber 30.

The head portion 20 may further comprise a fuel spray nozzle 32 for injection a fuel, such as diesel fuel into the compression chamber 30 for combustion. While a fuel spray nozzle 32 for injecting diesel fuel is shown, alternative embodiments may include the fuel spray nozzle 32 optionally replaced by, in the example of a gasoline or natural gas engine, a spark plug for igniting an air/fuel or air/gas mixture for the combustion engine 10.

In one example, a combustion cycle the combustion engine 10 may include four piston strokes: an intake stroke, a compression stroke, a combustion stroke, and an exhaust stroke. The foregoing description assumes the combustion cycle of the engine 10 starts while the piston 14 is fully extended upward into the piston chamber 18, which is typically referred to as "top dead center" or TDC.

During the intake stroke, a rotation of the crankshaft (illustrated by clockwise arrow 34) pulls the piston 14 out of the compression chamber 30 (shown in dotted line 36) in a downward intake stroke 38, creating a vacuum in the compression chamber 30. The vacuum draws in air from the sealable intake passage 22, which is unsealed due to the opening of the intake valve 26 (illustrated in dotted line 40) and timed to correspond with the intake stroke 38.

Figure 3:
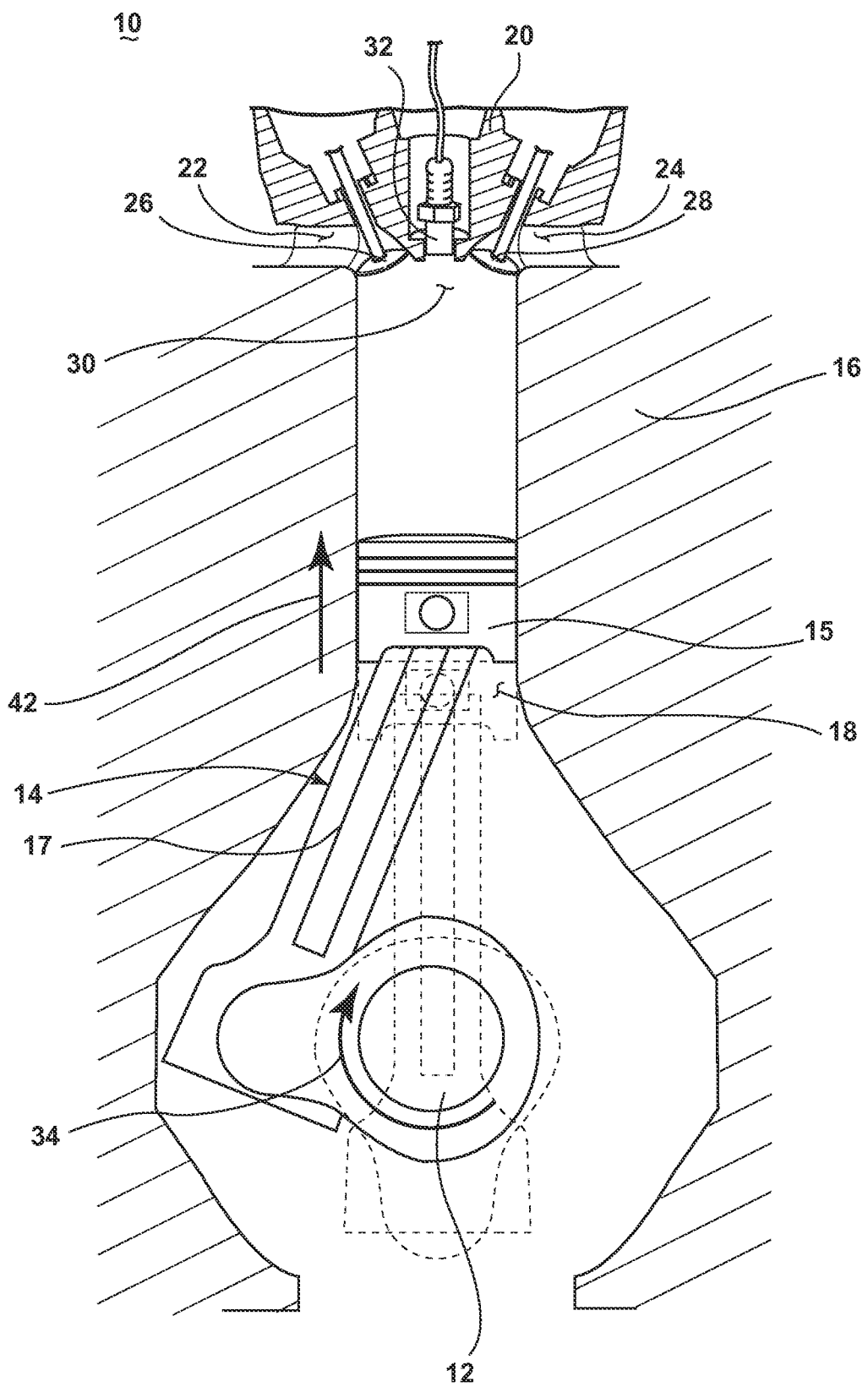
FIG. 3 is a schematic cross-sectional view of the piston of FIG. 1, illustrating a compression stroke, in accordance with various aspects described herein.

Turning now to FIG. 3, once the piston 14 reaches the lowest point of its intake stroke (illustrated in dotted line), the intake valve 26 is sealed, and the piston begins an upward compression stroke 42. The compression stroke 42 slides the piston 14 into the pressure chamber 30 compressing the air. At the TDC position of the compression stroke 42, the fuel spray nozzle 32 may inject diesel fuel into the compression chamber 30. Alternatively, a combustible fuel may be added to the intake air prior to the intake stroke 38, or fuel may be added to the compression chamber 30 during the compression stroke 42.

Combustion may occur in the compression chamber due to the high heat and high pressure of the compressed air/fuel mixture (for example, in a diesel engine), or, alternatively, due to external ignition, such as a spark generated by a spark plug (for example, in a gasoline or natural gas engine) in the compression chamber 30.

Figure 4:
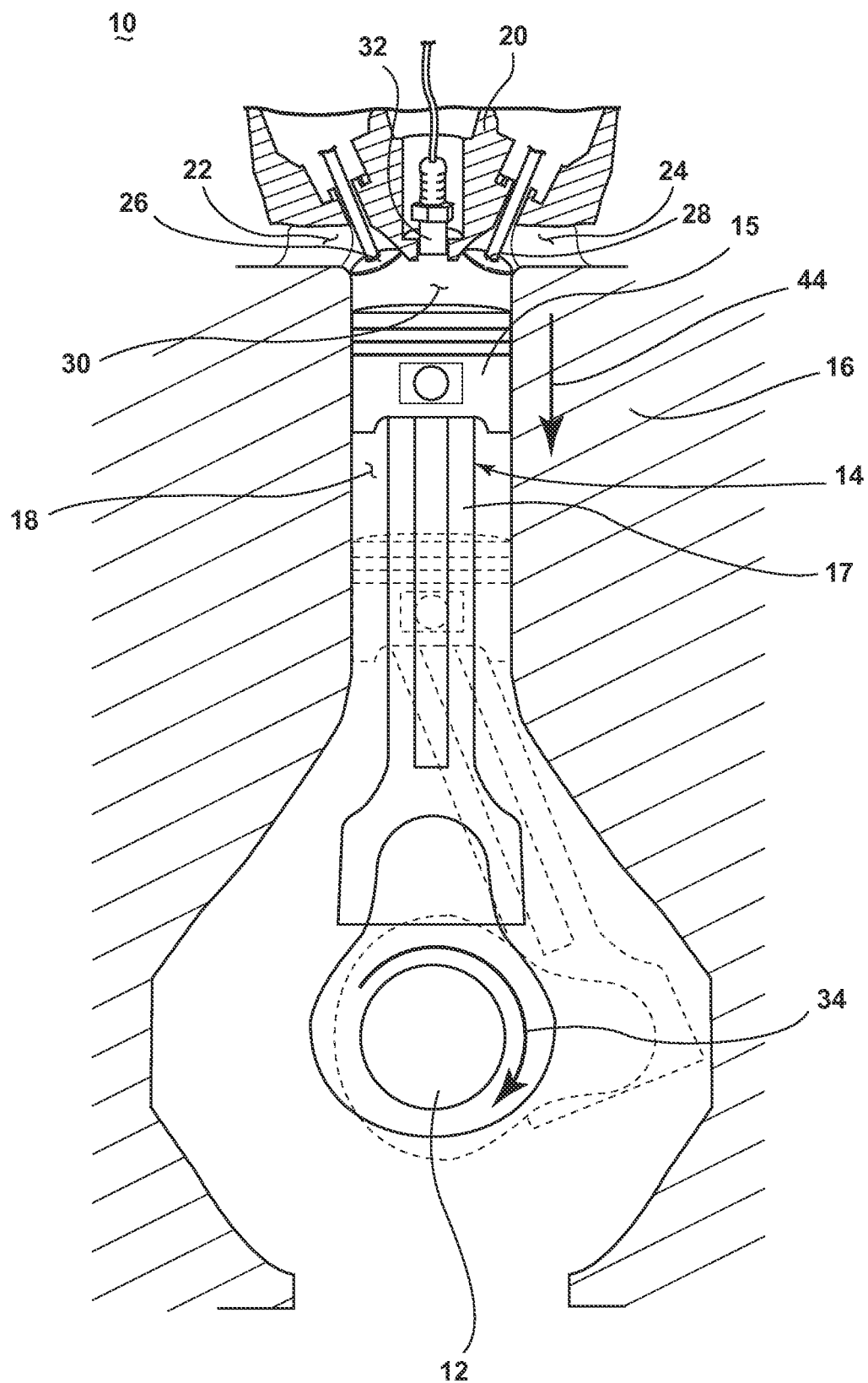
FIG. 4 is a schematic cross-sectional view of the piston of FIG. 1, illustrating a combustion stroke, in accordance with various aspects described herein.

FIG. 4 illustrates the combustion stroke. During the combustion stroke, the explosion of the air/fuel mixture generates heat in the compressed gases, and the resulting expansion of the explosion and expanding gases drives the piston in a downward stroke 44, away from the compression chamber 30. The downward stroke 44 mechanically drives the rotation 34 of the crankshaft 12.

Figure 5:
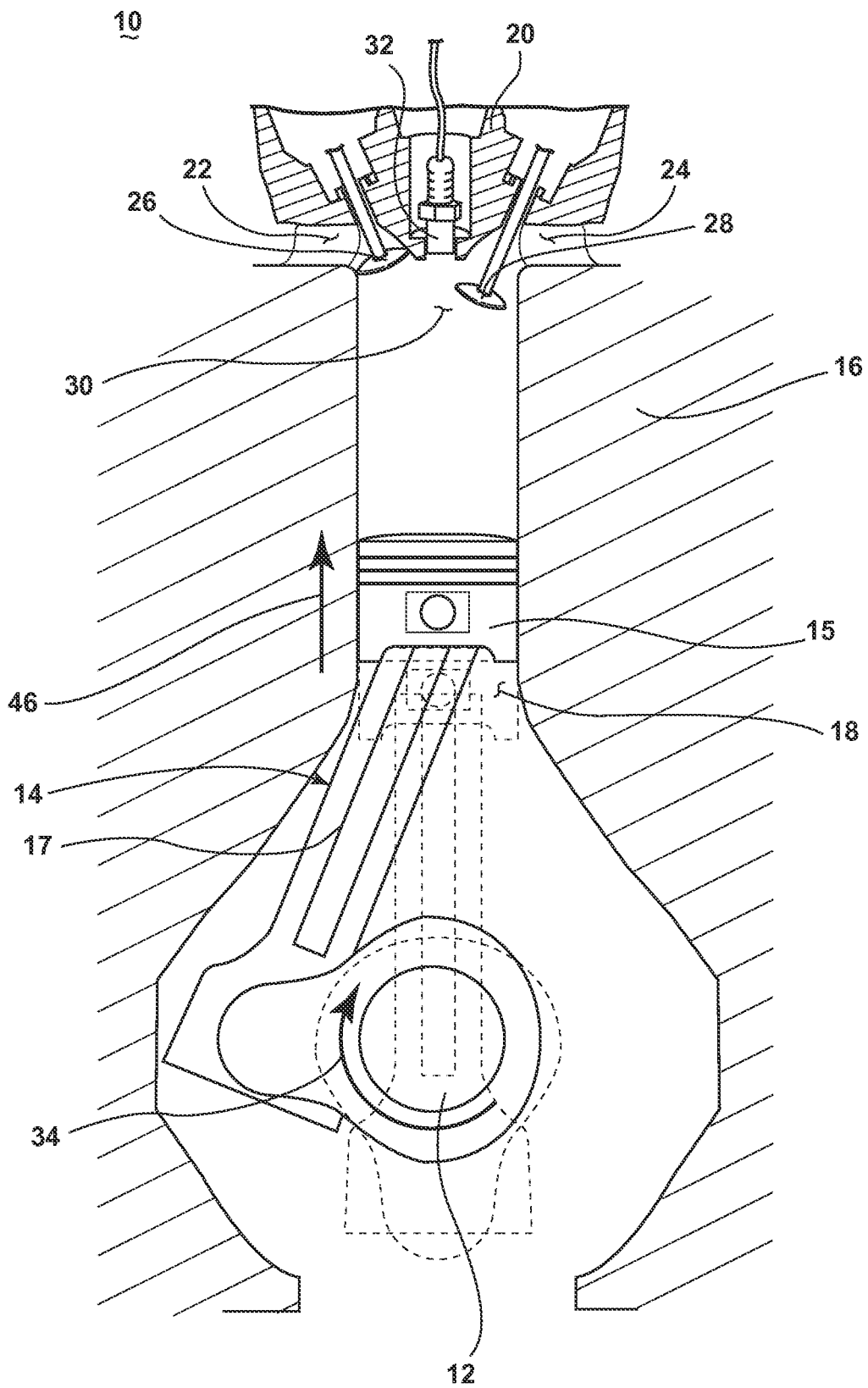
FIG. 5 is a schematic cross-sectional view of the piston of FIG. 1, illustrating an exhaust stroke, in accordance with various aspects described herein.

FIG. 5 illustrates the exhaust stroke. Following the combustion, the exhaust valve 28 is unsealed to correspond with the exhaust stroke, and the piston is driven upward 46 into the compression chamber 30 to push the combusted, or exhaust gases, out of the compression chamber 30. Once the piston 14 returns to the TDC position in the piston chamber 18, the combustion cycle of the engine 10 may then be repeated.

While a typical combustion engine 10 may have a plurality of pistons 14 and piston chambers 18, a single piston 14 is illustrated and described here for brevity. In a combustion engine 10 with multiple pistons 14, the pistons 14 may be configured along the crankshaft 12 to stagger the piston 14 strokes, such that one or more pistons 14 may be continuously providing a driving force (via the combustion stroke 44) to rotate the crankshaft 12, and thus the drive the pistons 14 through the additional combustion cycle strokes. The mechanical force generated by the rotation of the crankshaft 12 may be further delivered to drive another component, such as a generator, wheels, or a propeller.

Figure 6:
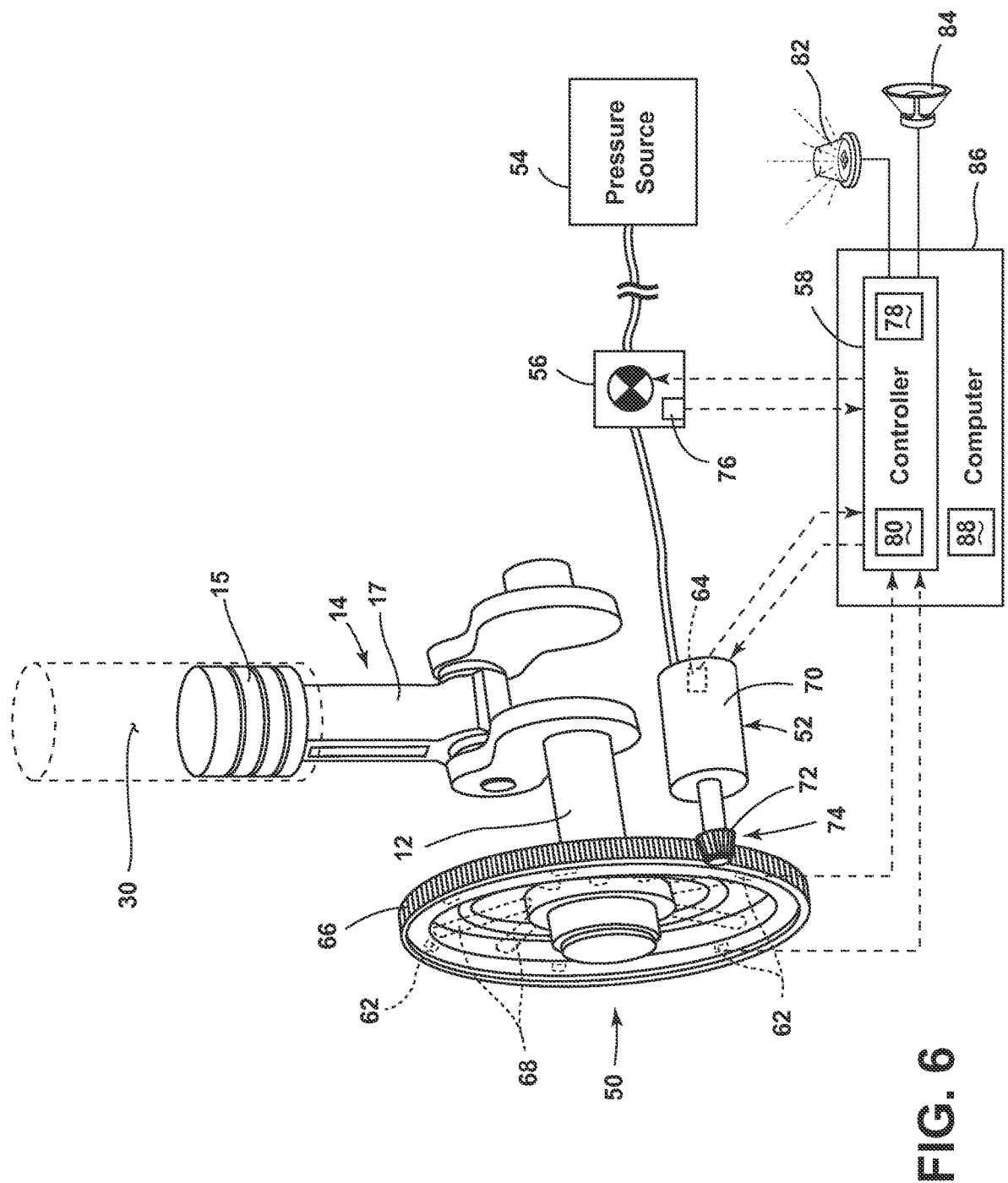
FIG. 6 is a schematic view of a pneumatic starter assembly rotationally coupled with the crankshaft, in accordance with various aspects described herein.

FIG. 6 illustrates an exemplary schematic configuration of starting a combustion engine 10. The configuration may include a flywheel 50 rotationally coupled with the crankshaft 12, a pneumatic starter 52, such as a pneumatic turbine engine starter, fluidly coupled with a pressure source 54 via a relay pressure valve 56, a computer 86, and a controller 58 or processor. As illustrated, the flywheel 50, may further include integrated position sensors 62 radially spaced about the flywheel 50, a radially extending outer surface of teeth 66 circumscribing the flywheel 50, and multiple spokes 68 (illustrated in dotted line) structurally securing the crankshaft 12, to the flywheel 50, such that the crankshaft 12 and flywheel 50 rotate in unison.

The position sensors 62 may be configured to operatively sense or measure position, rotation, or alignment information for at least one of the crankshaft 12 or flywheel 50. Examples of position, rotation, or alignment information may include top dead center (TDC) position for one or more pistons 14, or rotational speed of the flywheel 50, and thus, the crankshaft 12. Alternatively, the rotational speed of either the flywheel 50 and/or crankshaft 12 may also be referred to as the "engine speed." The position sensor 62 may be further capable of generating an analogue or digital signal representative of the information or characteristics, and may provide the generated signal to the controller 58.

While the flywheel 50 is illustrated coupled to the crankshaft 12 by spokes 68, the configuration of the coupling to the flywheel 50 to the crankshaft 12 is not germane to the embodiments, and alternative configurations may be included.

The pneumatic starter 52 is shown further comprising a body portion 70, a starter head 72, illustrated as a pinion gear, having a second set of teeth 74 keyed to mesh with the teeth 66 of the flywheel 50, and a starter sensor 64. The sensor 64 may be capable of sensing or measuring characteristics of the pneumatic starter 52, for example, the rotational speed of the starter head 72, or the torque generated by the starter 52. The sensor 64 may be further capable of generating an analogue or digital signal representative of the starter characteristics, and may provide the generated signal to the controller 58. Embodiments are envisioned wherein the starter 52 is, for example, mechanically and/or removably mounted to the engine 10. Alternatively, the starter 52 may be capable of controllably extending and retracting the starter head 72 portion of the starter 52, such that the sets of teeth 66, 74 may be engaged and/or disengaged only during starting operations. Additional configurations are envisioned.

As shown, the computer 86 may further comprise the controller 58, however embodiments may include the controller 58 located apart from the computer 86. The controller 58 may further include memory 78 in which is stored an operational profile, such as a diagnostic profile 80, for operating the starting method. The diagnostic profile 80 may include predetermined values related to engine performance, including but not limited to: engine speed limits, engine speed ranges, and/or pre-start diagnostic torque limits. The diagnostic profile 80 may be used for diagnosing engine problems, such as potential mechanical or pressure-related piston 14 issues, prior to starting the engine 10, and other predetermined or dynamic profile values may be included. The controller 58 is also shown further coupled with optional indicators capable of providing visual and/or audible indicia, such as a light indicator 82 and/or a speaker 84.

The memory 78 may include random access memory (RAM), read-only memory (ROM), flash memory, or one or more different types of portable electronic memory, such as discs, DVDs, CD-ROMs, etc., or any suitable combination of these types of memory. The controller 58 may be operably coupled with the memory 78 such that one of the controller 58 and the memory 78 may include all or a portion of a computer program having an executable instruction set for controlling the operation of the pressure valve 56, pneumatic starter 52, and/or the operating method, such as a starting profile, or a diagnostic profile. The program may include a computer program product that may include machine-readable media for carrying or having machine-executable instructions or data structures stored thereon. Such machine-readable media may be any available media, which can be accessed by a general purpose or special purpose computer or another machine with a processor. Generally, such a computer program may include routines, programs, objects, components, data structures, algorithms, etc. that have the technical effect of performing particular tasks or implement particular abstract data types. Machine-executable instructions, associated data structures, and programs represent examples of program code for executing the exchange of information as disclosed herein. Machine-executable instructions may include, for example, instructions and data, which cause a general purpose computer, special purpose computer, controller 58, or special purpose processing machine to perform a certain function or group of functions.

In implementation, the one or more operating or diagnostic profiles 80 may be converted to a diagnostic algorithm 88, which may be converted to a computer program comprising a set of executable instructions, which may be executed by at least one of the computer 86 or the controller 58.

The pressure valve 56 may include a controllable relay valve capable of regulating the air pressure supplied by the pressure source 54 to the pneumatic starter 52, in response to a control signal supplied by the controller 58. One example of a control signal supplied by the controller 58 may include a modulated signal. The pressure valve 56 may further include a pressure sensor 76 capable of sensing or measuring the air pressure supplied to the pneumatic starter 52, and generating an analogue or digital signal representative of the air pressure supplied to the pneumatic starter 52. The pressure valve 56 may further provide this pressure sensor 76 signal to the controller 58, for instance, as part of a feedback loop to ensure proper pressure valve 56 operation.

Furthermore, while each of the position sensors 62, starter sensor 64, and pressure sensor 76 are described as "sensing" and/or "measuring" the respective position, starter, and/or pressure information or characteristics, each of the sensings and/or measurings may include the determination of a value indicative or related to the respective information or characteristics, and not the actual values.

The pneumatic starter 52 and pressure valve 56 operate to generate force, such as a torque at the starter head 72, in response to a provided supply of air pressure. In one sense, the controller 58 may generate, for instance, a binary control signal to the pneumatic starter 52 to control the "on" or "off" operation of the starter 52. In another sense, the controller 58 may generate, for instance, a variable control signal to the pressure sensor 56, which may provide more or less air pressure to the starter 52, which if "on," will consequently generate correspondingly more or less torque. In this example, the controller 58 may operate the pneumatic starter 52 in a dual-control configuration.

The correlation between the air pressure supplied by the pressure valve 54 and the torque generated by the pneumatic starter 52 may include a linear and/or a non-linear increasing and/or decreasing relationship. Stated another way, an increase and/or decrease in torque may not be linearly related to a corresponding increase and/or decrease in air pressure. In one example, the relationship between the pressure and the corresponding torque may be defined in, for instance, a lookup table stored in the memory 78 of the controller 58, or as part of one or more operational profiles, such as the diagnostic profile 80.

The torque generated by the pneumatic starter 52 is applied (via the flywheel 50 and crankshaft 12) to generate the compression force used by the compression stroke 42 to compress the contents of the compression chamber 30. As pressure is a measurement of force over an area, and in the current embodiments, the area to be concerned with is likely the piston head 15, whose area does not change, as the piston 14 is the most likely component to fail under high pressure stress. In instances where the compression chamber 30 contains gases, the compression force needed to compress the volume of the compression chamber 30 may be inversely linear, according to Boyle's Law:

$$Pressure = 1/Volume$$

In instances wherein the compression chamber 30 contains relatively incompressible contents, for example, liquids such as water, the compression force needed to compress the volume of the compression chamber 30 increases dramatically. For example, the volume of the gas in a cylinder will be reduced under increased pressure in a manner following the constraints of the ideal gas law, whereas the liquid in the cylinder will resist compression and will not be reduced in volume when subject to an identical pressure.

The torque applied to the flywheel 50 to effect the movement of the piston 14 to may likewise be in a non-linear relationship with the rotational speed of the crankshaft 12. For example, while the piston 14 is proceeding through the intake stroke 38 or exhaust stroke 46, the torque applied by the pneumatic starter may be relatively unchanged, as the movement of the piston 14 in these strokes 38, 46 does not allow for the accumulation of notable pressure, due to the timed opening of the respective valves 26, 28. However, during compression stroke 42, the increase in pressure requires a corresponding increase in the amount of torque needed to effect a continued, or smooth, movement of the piston 14. Likewise, during the downward combustion stroke 44, the buildup of pressure from the compression stroke 42 will apply a downward force against the piston 14, and thus, reduce the amount of torque needed to effect a continued, or smooth, movement of the piston 14.

Additionally, embodiments may apply non-continuous torque to the flywheel 50, and may instead provide discrete or short bursts of torque to effect the movement of the piston 14. In this example, the rotational speed of the crankshaft 12 may be varied over time, for example, in a sinusoidal pattern.

Embodiments include applying a method of slow starting the combustion engine 10, wherein the slow starting of the combustion engine 10 prevent damage to the engine 10 if the compression chamber 30 contains an incompressible fluid, such as water. As used herein, "slow starting" the engine 10 may include pre-starting steps, that is, operations prior to attempting to start the engine 10 into a self-sufficient operating mode, as well as the starting steps. During the pre-starting steps, the engine 10 disables aspects of the combustion cycle which would result in the combustion of the fuel. For example, during the pre-starting steps, the engine 10 may disable the injection of fuel, operation of spark plugs, etc. Thus, the crankshaft 12 may be rotated during the slow start method, which may effect a movement of the piston 14 in the piston chamber 18 through the combustion cycle, without any combustion.

The method of the slow starting the engine 10 includes applying a force to the crankshaft 12 to effect a movement of one or more pistons 14 in the piston chamber 18 without providing pressure relief to the piston chamber 18 during a compression stroke 42 of the piston 14, sensing an engine 10 characteristic, comparing the sensed characteristic to a diagnostic profile 80 for the sensed characteristic, and ceasing the application of the force, to cease reciprocation of the pistons 14 when the comparison indicates a diagnostic fault condition exists. As used herein, "slow starting" is used to describe rotating at least one of the crankshaft 12 and/or flywheel 50 at a speed below operational, or self-sufficient running, engine speed, such as an idle speed. One non-limiting example of a "slow starting" may vary the rotation speed of the crankshaft 12 and/or flywheel 50 to a target speed of between 20 and 40 rotations per minute (RPM). While the target speed may be between 20 and 40 RPMs, temporal speeds outside of those ranges may be anticipated.

The slow speed, or "slow roll" operation of the method may allow for issues and/or concerns regarding proper engine operation to be identified before any internal damage may occur to the engine 10. Alternative "slow starting" engine speeds, engine speed targets, or speed ranges may be included.

The above-described sequence is for exemplary purposes only and is not meant to limit the slow starting method in any way, as it is understood that the portions of the method may proceed in a different logical order, additional or intervening portions may be included, or described portions of the method may be divided into multiple portions, or described portions of the method may be omitted without detracting from the described method.

The method starts with the controller 58, operating according to a diagnostic profile 80, controls the pressure valve 56 and pneumatic starter 52 to begin applying a force, or torque, to starter head 72, which in turn meshes with the teeth 66 of the flywheel 50, and thus, effects a movement of both the crankshaft 12 and the piston 14 in the piston chamber 18. The application of torque, thus, moves the pistons 14 through the combustion cycle (sans combustion), as explained above.

The controller 58 may further operate the applying of torque, to effect a continued rotation of the crankshaft 12, according to the diagnostic profile 80, in response to receiving one or more signals from the position sensors 62, starter sensor 64, and/or pressure sensor 76. Collectively, the signals received from the sensors 62, 64, 76 may define at least one reciprocating engine characteristic, which may include, for example, the TDC position of the one or more pistons 14, the engine speed, a responsive piston chamber 18 or compression chamber 30 pressure, or an applied and/or responsive torque of the flywheel 50 and/or the starter head 72. While the engine speed is described as one possible reciprocating engine characteristic, it is noted the engine speed may not be sensed or measured directly, and may instead be interpreted and/or converted from another measurement or signal, such as the repetition of an engine 10 cylinder or TDC position, or the speed of the starter head 72. Additionally, while the piston chamber 18 or compression chamber 30 pressure is described as one possible reciprocating engine characteristic, it is noted the piston chamber 18 or compression chamber 30 pressure may not be sensed or measured directly, and may instead be interpreted and/or converted from another measurement or signal, such as the torque applied to the starter head 72, or the change in engine speed.

The controller 58 may control the continued slow roll of the engine 10 until the method is completed, by controlling the pneumatic starter 52 (for instance, by turning the starter 52 "on" and "off," as described above) and varying the air pressure supplied to the starter 52, via the pressure valve 56.

As the flywheel 50 is rotated, and the piston 14 proceeds through the different combustion cycles, the piston will proceed with the compression stroke 42, wherein the piston 14 stroke compresses the compression chamber 30 without providing pressure relief, for example, through the intake valve 26, exhaust valve 28, or via another opening. Embodiments may include a specialized timing for the operation of the intake and exhaust valves 26, 28, and/or any other openings, such that each upward stroke of the piston 14 may be a compression stroke 42, or fewer strokes than described in the combustion cycle are compression strokes 42 (i.e. every sixth stroke).

The air supplied by the pressure valve 56 to the pneumatic starter 52 may be non-continuous due to the low speed operation necessary for adequate slow roll performance. For example, the controller 58 may control the pressure valve 56 to provide bursts of supply air to keep the flywheel moving at predicted or target speed, or to overcome a peak torque, which may occur due to a maximum compression point on the piston stroke, typically occurring at the TDC position of the piston 14 on the compression stroke 42. Embodiments may include the controller 58 and/or the diagnostic profile 80 anticipating or predicting moments of peak torque, and pre-emptively applying additional air pressure to overcome the peak torque, in order to keep the flywheel 50 rotating smoothly. Additionally, the controller 58 and/or the diagnostic profile 80 may take into account any delay in the operation of specific components used in the method, such as a delay in operating the pressure valve 56, and pre-emptively operate aspects of the component to mitigate any expected time delays.

While the slow roll of the engine 10 is occurring, the controller 58 receives at least one of the reciprocating engine characteristics described above, and may compare the sensed characteristic to the diagnostic profile 80 such that the controller 58 may determine whether the slow starting operating is proceeding as expected, based on the sensed characteristic. For example, the controller 58 may compare the engine speed to the target speed range, and apply more or less torque, when necessary, to ensure the proper engine speeds are maintained. In another example, the controller 58 may compare the torque applied to rotate the flywheel 50 against a maximum torque limit, such that the torque applied does not exceed the maximum torque limit.

Additional comparisons may be included wherein the reciprocating engine characteristic may be compared to corresponding characteristic reference values of the diagnostic profile 80. The characteristic "comparison" to the diagnostic profile 80 may be used herein to mean that the characteristic "satisfies" the profile 80 or predetermined values or thresholds, such as being equal to or less than the profile 80 values. It will be understood that such a comparison or determination may easily be altered to be satisfied by a positive/negative comparison or a true/false comparison of the diagnostic profile 80.

If the comparison of the sensed characteristic with the diagnostic profile 80 indicates an error, fault condition, or other unexpected result occurs during the slow roll, the controller 58 may control at least one of the starter 52 and/or pressure valve 56 to cease applying the force to the flywheel 50, and hence, cease reciprocation of the piston 14. In this scenario, the flywheel 50 may be actively stopped by, for instance, a braking mechanism, application of a reverse torque by the starter 52 and/or pressure valve 56, or it may be allowed to coast to a stop at the flywheel's own pace.

One example error, fault condition, or other unexpected result that may occur during the application of the slow starting method may include indication that the piston chamber 18 contains an incompressible liquid, for example, water. This scenario may be known as hydrostatic lock, and may cause damage to the engine 10 when a piston 14, in a compression stroke 42, attempts to compress the contents of the compression chamber 30. In this example, the controller 58 may compare the sensed characteristic to a diagnostic profile 80 indicative of hydrostatic lock or maximum piston chamber 18 pressure. For example, if the torque applied to the flywheel 50 exceeds a maximum torque threshold, the controller 58 may determine that a hydrostatic lock condition is present, and may cease the application of torque to the flywheel 50.

In an example of hydrostatic lock, the flywheel 50 will be rotating slowly, such that in the event of ceasing applying the torque after the determination of hydrostatic lock, the incompressible liquid would not damage the engine 10, piston 14, or other components. In addition to ceasing the application of torque and the reciprocation of the pistons 14, the controller 58 may provide indicia, in the form of visual indicia, such as blinking light, or audible indicia, such as an alarm or sound, on either of the respective light 82 or speaker 84.

Alternatively, if the comparison of the sensed reciprocating engine characteristic to the diagnostic profile 80 does not indicate and errors, fault conditions, and/or other unexpected results occur, the controller 58 may continue to control the rotation of the flywheel 50, and even control the pneumatic starter 52 and pressure valve 56 to effect a starting of the combustion engine 10. In this example, the controller 58 may control the method according to the diagnostic profile 80 to proceed through one or more combustion cycles (sans combustion) or compression strokes 42 to verify no errors or faults exist. At that time, the controller 58 may cease the comparing of the diagnostic profile 80, and increase the air supplied by the pressure valve 56, which in turn increases the torque applied to the flywheel 50 by the pneumatic starter 52, to increase the engine speed to an appropriate level to start the engine 10 into a mode of self-sufficiency using the combustion cycle, with combustion occurring.

Figure 7:
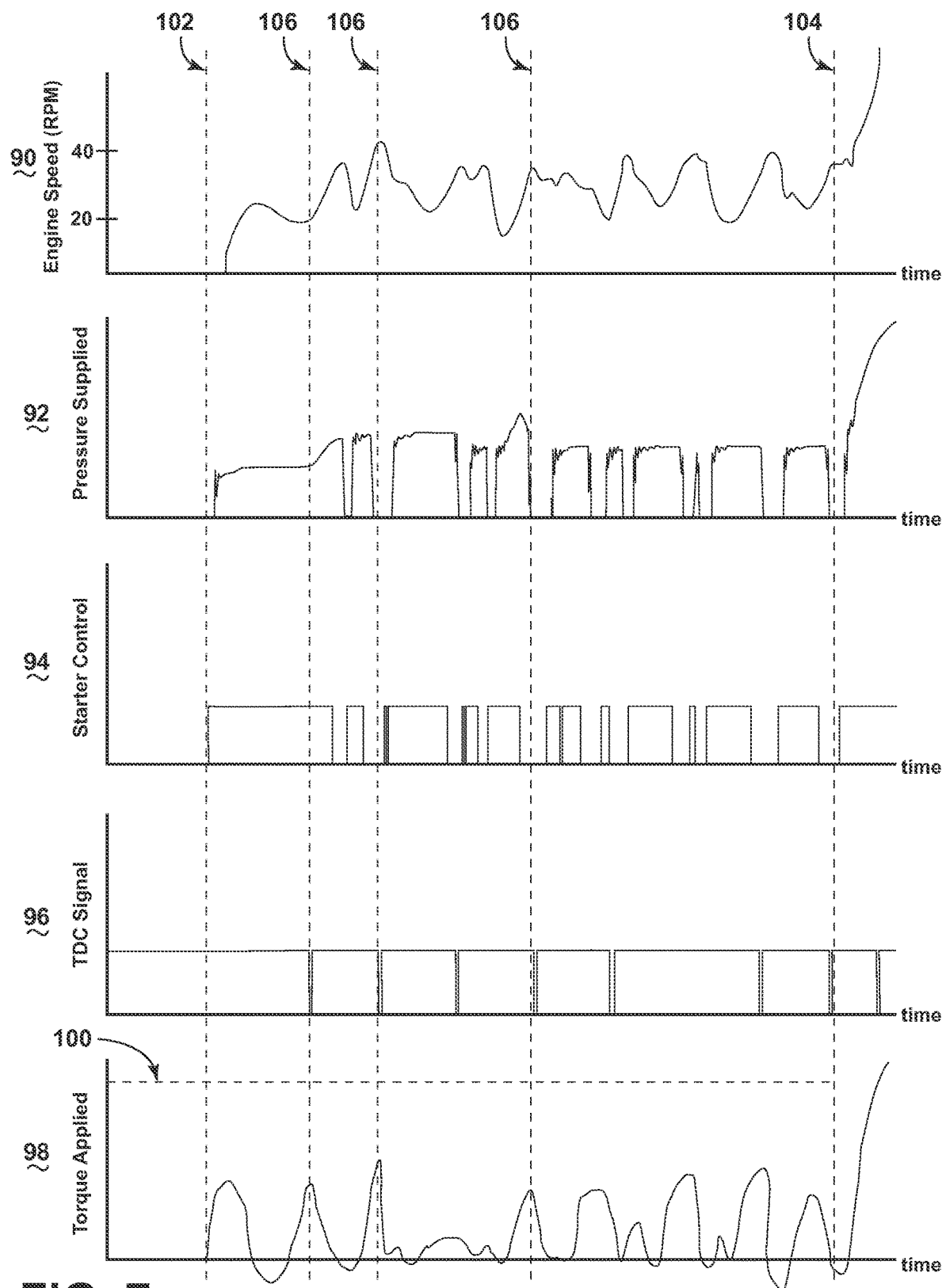
FIG. 7 is a series of graphs illustrating the method of slow starting the combustion engine, wherein the engine is started, in accordance with various aspects described herein.

FIG. 7 illustrates a set of example graphs, showing a slow start method wherein no errors occur, and the engine is started. The graphs provided are intended to illustrated one non-limiting example of the method, as described, and do not specifically represent any necessary signals, sensors, values, or operations of the method. Additionally, the graphs shown may only represent a single piston pre-starting operation. A first graph 90 is shown illustrating the engine speed over time, a second graph 92 is shown illustrating the pressure supplied by the pressure valve 56 over time, a third graph 94 is shown illustrating the starter control signal supplied by the controller 58 to the pneumatic starter 52 over time, a fourth graph 96 is shown illustrating the position of the piston 14, as measured by a TDC sensor over time, and a fifth graph 98 is shown illustrating the torque applied by the pneumatic starter 52 to the flywheel 50 over time, as well as a maximum torque limit 100, for example, as defined by the diagnostic profile 80. The graphs 90, 92, 94, 96, 98 may also be converted into data to form an example diagnostic profile 80.

Also shown are a first time instance 102 and a second time instance 104. At the first time instance 102, the controller 58 turns on the pneumatic starter 52, as seen in graph 94, and begins supplying air pressure, as seen in graph 92. The pneumatic starter 52 and air pressure supplied generate a torque, as seen in graph 98, which begins to rotate the flywheel 50, as seen in graph 90. In between the first time instance 102 and the second time instance 104, the pneumatic starter 52 and pressure valve 56 are controlled by the controller 58 according to the diagnostic profile 80 to vary the engine speed via the torque applied, to between 20 and 40 RPMs, as described in the method above.

As illustrated by the plurality of TDC signal indications in graph 96, the flywheel 50 is rotated through a number of piston 14 cycles without the torque applied exceeding the maximum torque limit 100, as seen in graph 98. The set of example graphs additionally illustrate several time instances 106 wherein the controller 58 controls the pressure valve 56 to provide bursts of supply air to keep the flywheel moving to overcome a peak torque, as seen in 98, which corresponds with the maximum compression point, or TDC position, of the piston 14 stroke, as seen in graph 96.

At the second time instance 104, the controller 58, in accordance with the diagnostic profile 80, has determined the combustion engine 10 is free of errors and safe to start. At this instance 104, the controller 58 ceases the comparison of, for example, the torque curve of graph 98 with the maximum torque limit 100, and significantly increases the air pressure supplied to the pneumatic starter 52, as seen in graph 92, to effect an increase in engine speed, as seen in graph 90. In this example, it is not necessary to stop the engine or perform any additional method steps prior to starting the combustion engine 10. Stated another way, the combustion engine 10 may be started by the controller 58, upon confirmation that no errors exist.

Figure 8:
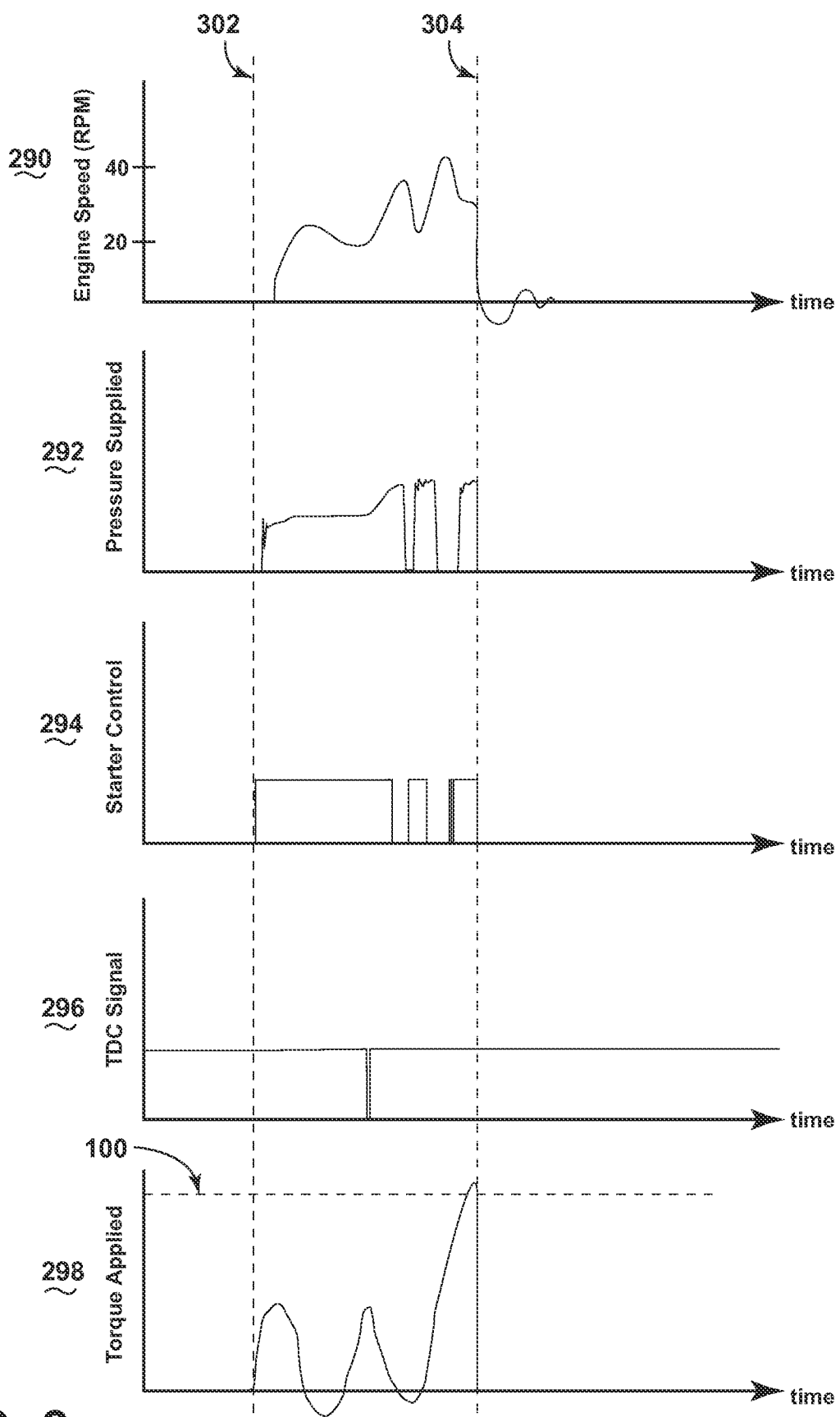
FIG. 8 is a series of graphs illustrating the method of slow starting the combustion engine, wherein the engine is not started due to the determination of a fault, in accordance with various aspects described herein.

FIG. 8 illustrates a second set of example graphs, showing a slow start method wherein an error occurs. The second set of example graphs are similar to the first set of example graphs; therefore, like parts will be identified with like numerals increased by 200, with it being understood that the description of the like parts of the first set of example graphs applies to the second set of example graphs, unless otherwise noted. Again, the second set of example graphs provided are intended to illustrated one non-limiting example of the method, as described, and do not specifically represent any necessary signals, sensors, values, or operations of the method.

The second set of example graphs illustrates the same first time instance 102, wherein the method is initiated, and the flywheel 50 begins rotating, and a second time instance 304. At the second time instance 304, the torque applied, as seen in graph 298, rises above the maximum torque limit 100, indicating an error has occurred, such as a hydrostatic locking condition. At this second time instance 304, the controller 58 controls the air pressure supplied, as seen in graph 292, and the starter control, as seen in graph 294, to cease providing torque to the flywheel 50, which in turn, causes the engine speed to quickly reduce to zero, and briefly turn negative, in response to the compression chamber 30 pressure generated by the hydrostatic lock condition rotating the crankshaft 12 in the reverse direction.

Many other possible embodiments and configurations in addition to that shown in the above figures are contemplated by the present disclosure. For example, in an engine having a plurality of pistons, the above-described method may be equally applied to each piston such that a fault or error in any of the pistons may be detected and indicated to a user. In this scenario, embodiments may include indicia indicating an error or fault has occurred, and may be capable of indicating where the fault has occurred (i.e. in which compression chamber, etc.). Additionally, the design and placement of the various components may be rearranged such that a number of different in-line configurations could be realized.

The embodiments disclosed herein provide a method for slow starting a reciprocating engine. The technical effect is that the above described embodiments enable the application of a force to rotate the crankshaft through a pre-starting period to determine if one or more fault conditions exist. One advantage that may be realized in the above embodiments is that the above described embodiments integrate error and/or fault detection of conditions such as hydrostatic lock, directly into a controllable engine sequence. By detecting any fault conditions prior to starting the engine, scenarios can be avoided wherein the fault condition may have caused damage to the engine, requiring extensive and expensive repair. The controllable engine sequence may further be integrated into the engine starting sequence to provide a complete solution to detecting faults and starting the engine when no faults are detected. Another advantage of the above-described embodiments is that the method provides for indicia to a user that an error or fault has occurred, and in embodiments having a plurality of pistons, where the fault has occurred.

The method additionally eliminates the need to employ manual detection methods for determining if a fault, such as hydrostatic lock, is present. These manual methods typically involve lengthy, labor intensive review processes that may otherwise be performed before the starting of the engine. Additionally, the manual detection methods may expose the interior of the piston chamber and/or the pistons to undesirable debris in the process of determining if liquid ingestion has occurred. In yet another advantage of the above-described embodiments, the continuous torque monitoring may offer a user or system the advantageous capabilities of recording and analyzing information regarding operation of the engine not otherwise, or previously, available.

To the extent not already described, the different features and structures of the various embodiments may be used in combination with each other as desired. That one feature may not be illustrated in all of the embodiments is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the embodiments, including the best mode, and also to enable any person skilled in the art to practice the embodiments, including making and using any devices or systems and performing any incorporated methods. The patentable scope of the application is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of slow starting a reciprocating engine, having a crankshaft rotationally coupled with a piston reciprocally movable within a corresponding piston chamber and having a controller for automatically executing the method in signal communication with a starter, the method comprising:
   applying a force to the crankshaft via the starter to effect a movement of the piston in the piston chamber without providing pressure relief to the piston chamber during a compression stroke of the piston;
   sensing a reciprocating engine characteristic correlated with an engine speed of the reciprocating engine;
   anticipating or predicting moments of a peak torque, and pre-emptively applying additional air pressure to overcome the peak torque, in order to keep the crankshaft rotating smoothly;
   comparing the sensed characteristic to a diagnostic profile for the sensed characteristic, where the diagnostic profile is stored in a memory of the controller;
   ceasing the application of the force from the starter via a signal from the controller to the starter and/or a pressure valve, to cease reciprocation of the pistons when the comparison indicates a diagnostic fault condition exists.

2. The method of claim 1 further comprising controlling the application of the force when the comparison does not indicate a diagnostic fault condition exists, wherein the controlling the application of the force is based on the comparison, such that the application of the force effects a continued rotation of the crankshaft at a speed less than an operating speed.

3. The method of claim 2 wherein controlling the application of force based on the comparison further comprises controlling the continued rotation of the crankshaft at a speed between 20 and 40 rotations per minute.

4. The method of claim 1 wherein sensing the reciprocating engine characteristic further comprises sensing at least one of an engine speed, a responsive piston chamber pressure, a responsive crankshaft torque, or an engine cylinder position.

5. The method of claim 1 wherein comparing further comprises comparing the sensed characteristic to a diagnostic profile indicative of at least one of hydrostatic lock or piston chamber pressure.

6. The method of claim 5 further comprising ceasing the method upon satisfying the comparison of the sensed characteristic to a diagnostic profile indicative of hydrostatic lock.

7. The method of claim 1 wherein starting rotation of the crankshaft further comprises providing a pneumatic starter mechanically coupled with the crankshaft.

8. The method of claim 5 wherein sensing of a reciprocating engine characteristic further comprises sensing at least one of a starter speed or a starter torque.

9. The method of claim 8 wherein applying a force to the crankshaft comprises varying at least one of a pneumatic starter operation or a pneumatic pressure supplied to the starter, according to a diagnostic algorithm.

10. A method of slow starting with a pneumatic starter a reciprocating engine having pistons reciprocally movable within corresponding cylinders and operably coupled to a rotatable crankshaft in signal communication with a controller for automatically executing the method wherein a relative rotation of the crankshaft results in a relative corresponding reciprocation of the pistons, the method comprising:
supplying air to a pneumatic starter to rotate the crankshaft at a slow start speed below an operational rotational speed and effect a reciprocation of the pistons without providing pressure relief to the corresponding piston chamber during a compression stroke of the piston;
sensing a reciprocating engine characteristic correlated with an engine speed of the reciprocating engine;
anticipating or predicting moments of a peak torque, and pre-emptively applying additional air pressure to overcome the peak torque, in order to keep the crankshaft rotating smoothly;
comparing the sensed characteristic to a diagnostic profile for the sensed characteristic where the diagnostic profile is stored in a memory of the controller;
determining whether a diagnostic fault condition exists or does not exist based on the comparison; and
at least one of ceasing supplying air to the pneumatic starter or stopping operation of the pneumatic starter, to cease reciprocation of the pistons when a diagnostic fault condition exists.

11. The method of claim 10 further comprising at supplying air to the pneumatic starter to rotate the crankshaft above the slow start speed and start the engine when a diagnostic fault condition does not exist.

12. The method of claim 10 wherein sensing the reciprocating engine characteristic further comprises sensing at least one of an engine speed, a responsive piston chamber pressure, a responsive crankshaft torque, an engine cylinder position, a pneumatic starter speed, or a pneumatic starter torque.

13. The method of claim 12 wherein supplying air to the pneumatic starter further comprises varying at least one of a pneumatic starter operation or a pneumatic pressure supplied to the starter, according to a diagnostic algorithm.

14. The method of claim 10 wherein supplying air to a pneumatic starter to rotate the crankshaft at a slow start speed below an operational rotational speed comprises rotating the crankshaft between 20 and 40 rotations per minute.

15. The method of claim 10 wherein comparing further comprises comparing the sensed characteristic to a diagnostic profile indicative of at least one of hydrostatic lock or piston chamber pressure.

16. A starter assembly for automatically controlling a starting sequence for a reciprocating engine having a crankshaft rotationally coupled with at least one piston reciprocally movable within a corresponding piston chamber, the system comprising:
a flywheel rotationally coupled with the crankshaft;
a pneumatic starter mechanically engaged with the flywheel and having a starter sensor;
a pressure valve fluidly coupled to the pneumatic starter; and
a controller in signal communication with the starter sensor and at least one of a position sensor or a pressure sensor, and including a memory in which a diagnostic profile;
wherein during the starting sequence the controller sends a signal to the starter to apply a force causing movement of the crankshaft, receives a signal from the starter sensor of a sensed characteristic correlated with an engine speed of the reciprocating engine, anticipates or predicts moments of peak torque, and pre-emptively applies additional air pressure to overcome the peak torque, in order to keep the flywheel rotating smoothly, compares the sensed characteristic to the diagnostic profile, and upon receiving a signal from the starter sensor that a diagnostic fault condition exists, the controller sends a signal to the starter to cease application of the force causing movement of the crankshaft via one of the pressure valve or the flywheel.

17. The starter assembly of claim 16 wherein the flywheel further comprises teeth and the pneumatic starter further comprises a starter head with teeth keyed to mesh with the teeth of the flywheel.

18. The starter assembly of claim 17 wherein the flywheel further comprises a position sensor in signal communication with the controller.

19. The starter assembly of claim 17 wherein the starter head is retractable.

20. The starter assembly of claim 16 wherein the pressure valve further comprises a pressure sensor in signal communication with the controller.

* * * * *